United States Patent [19]

Schliebener et al.

[11] 4,297,204
[45] Oct. 27, 1981

[54] THERMAL CRACKING WITH POST HYDROGENATION AND RECYCLE OF HEAVY FRACTIONS

[75] Inventors: Claus Schliebener, Strasslach; Hans J. Wernicke, Wolfratshausen, both of Fed. Rep. of Germany

[73] Assignee: Linde Aktiengesellschaft, Hollriegeiskreuth, United Kingdom

[21] Appl. No.: 13,110

[22] Filed: Feb. 21, 1979

[30] Foreign Application Priority Data

Feb. 17, 1978 [DE] Fed. Rep. of Germany ....... 2806854

[51] Int. Cl.³ .................. C10G 9/16; C10G 53/04; C10G 69/06
[52] U.S. Cl. .................................. 208/95; 208/87; 208/89; 208/96; 208/106; 208/130; 585/324
[58] Field of Search ....................... 208/95–96, 208/56, 48 R, 39, 45, 57, 106–107, 309, 56, 145; 585/324

[56] References Cited

U.S. PATENT DOCUMENTS

| | | | |
|---|---|---|---|
| 2,729,589 | 1/1956 | Waghorne et al. | 208/309 |
| 2,943,050 | 6/1969 | Beavon | 208/309 |
| 3,779,895 | 12/1973 | Wilson et al. | 208/309 X |
| 3,781,195 | 12/1973 | Davis et al. | 208/87 |
| 3,839,484 | 10/1974 | Zimmerman et al. | 585/315 |
| 3,898,299 | 8/1975 | Jones | 208/57 X |
| 3,907,920 | 9/1975 | Starks | 208/57 X |
| 3,944,481 | 3/1976 | Wing et al. | 208/61 |
| 4,061,562 | 12/1977 | McKinney et al. | 208/61 |
| 4,065,379 | 12/1977 | Soonawala et al. | 208/143 X |
| 4,090,947 | 5/1978 | Satchel | 208/56 |
| 4,115,246 | 9/1978 | Sweany | 208/56 |
| 4,115,467 | 9/1978 | Fowler | 208/58 X |
| 4,137,147 | 1/1979 | Franck et al. | 208/61 |
| 4,145,276 | 3/1979 | Cosyns et al. | 208/57 |
| 4,180,453 | 12/1979 | Franck et al. | 208/57 |
| 4,188,281 | 2/1980 | Wernicke | 208/57 |

*Primary Examiner*—Delbert E. Gantz
*Assistant Examiner*—G. E. Schmitkons
*Attorney, Agent, or Firm*—Millen & White

[57] ABSTRACT

In a process for the thermal cracking of hydrocarbons to produce olefins, improvement of recovering hydrocarbons boiling above 200° C. from the thermal cracking stage, preferably removing polymeric components therefrom, catalytically hydrogenating resultant hydrocarbons boiling above 200° C., and recycling resultant hydrogenated hydrocarbons to the thermal cracking stage.

9 Claims, 1 Drawing Figure

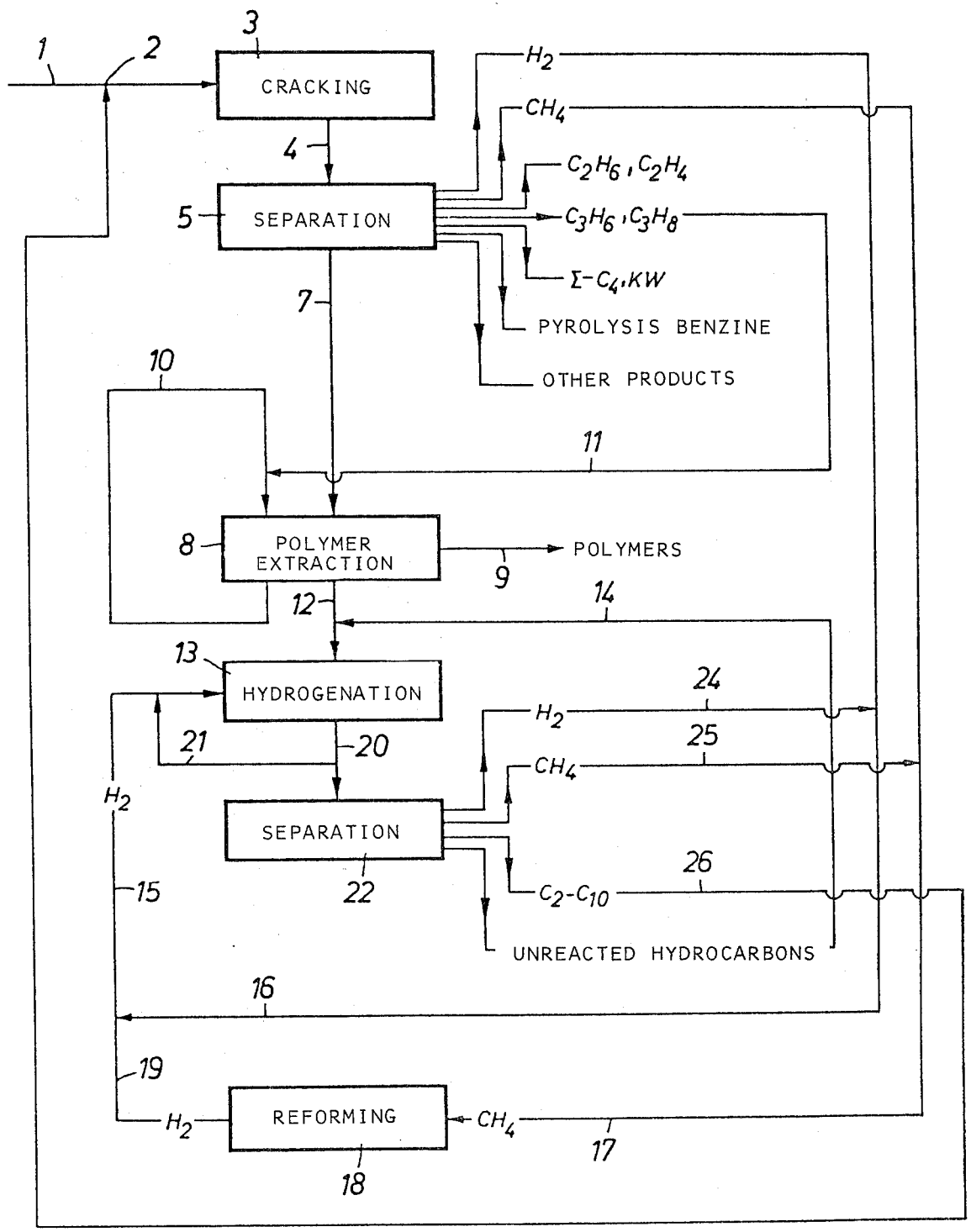

THERMAL CRACKING WITH POST HYDROGENATION AND RECYCLE OF HEAVY FRACTIONS

BACKGROUND OF THE INVENTION

The invention relates to a process for the thermal cracking of hydrocarbons for the production of olefins.

To produce olefins, it is conventional and advantageous to employ light hydrocarbons, such as, for example, ethane or propane, or hydrocarbon mixtures having a boiling point of below 200° C., such as, for example, naphtha, as starting materials for a thermal cracking operation. These starting materials result in a high yield in olefins and relatively few undesirable by-products.

However, in view of the high demand for olefins, which may lead to a short supply and increase in price of the aforementioned advantageous starting materials, several attempts have been made through the years to develop processes which permit the utilization of higher-boiling starting materials. The basic problem involved in the use of higher-boiling starting materials, i.e., above 200° C., is a reduced olefin yield and the formation of liquid cracked products, the proportion of which increases sharply as the boiling range of the starting material increases. The liquid cracked products are generally separated into a fraction boiling below 200° C. and into a fraction boiling above 200° C. The lower-boiling fraction represents a high-octane fuel and contains valuable components, such as benzene, toluene, and xylene. The fraction boiling above 200° C., in contrast thereto, constitutes an undesirable product containing highly condensed aromatics, polymeric compounds, and sulfur compounds. The proportion of this fraction (called pyrolysis fuel oil hereinbelow) is, when cracking naphtha, in the range of about 1–5% by weight of the total products but rises when using gas oil to a magnitude of 30% by weight, and to still higher values when using heavier charges, such as vacuum gas oil or crude oil, or crude oil residues. The sulfur contained in the starting material is enriched in the pyrolysis fuel oil fraction in such quantities that the combustion of this fuel alone without admixing low-sulfur fuels leads to a waste gas which is unduly contaminated. The mixture with low-sulfur fuels, however, is connected with additional problems, since pyrolysis fuel oil is miscible only to a limited extent with crude oil distillates and thus can be blended with the latter only partially. Another disadvantageous property of the pyrolysis fuel oil is to be seen in that it lends itself only under certain conditions to storage and transportation.

The production of olefins by cracking hydrocarbon mixtures having a boiling range of above 200° C., such as, for example, gas oil or vacuum gas oil is economically infeasible, unless measures are taken to reduce the quantities of thus-formed pyrolysis fuel oil or unless the pyrolysis fuel oil can be passed on to some other economical usage.

A process has been known from DOS (German Unexamined Laid-Open Application) No. 2,164,951 (equivalent to U.S. Pat. No. 3,781,195) which is suitable for the production of olefins from high-boiling hydrocarbon mixtures. In this process, the starting material is catalytically hydrogenated, prior to the thermal cracking thereof, in the presence of hydrogen. The hydrogenating pretreatment leads to a reduction in the content of polyaromatic compounds which are essentially responsible for the formation of the pyrolysis fuel oil. Moreover, a desulfuration of the starting material takes place as well. The operation of such a process, however is burdened by high initial investment costs for a plant for the hydrogenation of the starting material and by high operating costs since large amounts of hydrogen must be made available.

SUMMARY OF THE INVENTION

In the light of the above background, an object of the present invention is to provide a relatively economical process for the production of olefins from hydrocarbons, especially from higher-boiling hydrocarbon mixtures, said process being distinguished by moderate investment and operating costs.

Upon further study of the specification and appended claims, further objects and advantages of this invention will become apparent to those skilled in the art.

These objects are attained by a process comprising subjecting the fraction of hydrocarbons obtained from a thermal cracking step and boiling above about 200° C. to a catalytic hydrogenation step and they recycling the thus-hydrogenated hydrocarbons to the thermal cracking stage. Thus, hydrocarbon boiling below about 200° C. need not be hydrogenated.

Whereas in the conventional process disclosed in DOS No. 2,164,951 the entire starting material is passed on to the hydrogenation pretreatment, the process of this invention first effects the thermal cracking step and thereafter merely the working up of the undesired, heavy cracked products. Since the latter constitute only a fraction of the starting material, e.g., from about 1 to 45%, depending on the nature of the starting material, the use of substantially smaller apparatus permitting a considerable reduction in capital outlay has been made possible. In addition, the advantage is obtained when conducting the process of this invention as compared to the conventional process that the hydrogen required for the hydrogenation is utilized completely for the treatment of the pyrolysis fuel oil. Any undesired hydrocracking reactions with a cleavage of low-boiling components of the starting material, leading to an increased hydrogen consumption, are entirely avoided. The hydrogenation of the pyrolysis fuel oil leads to a product offering favorable conditions for thermal cracking. Therefore, this product is recycled to the thermal cracking stage together with untreated starting material.

Another advantage of the process of this invention is that isomerization of n-alkanes and n-alkyl chains, which takes place during the hydrogenation pretreatment of the starting material, is now avoided for the most part. This proves to be very advantageous, since the aforementioned components lead to high olefin yields in the cracking stage.

With respect to the identification of the fraction obtained from the thermal cracking step as boiling above 200° C., it is intended to include fractions having an initial boiling point in the range between 175° C. to 220° C. The selection of the initial boiling point mainly depends on the quality of the lower boiling liquid products which, with regard to an intended use or further treatment of these products, should not exceed a certain maximum boiling point, but it is not critical in view of the hydrogenation according to the invention. Therefore, in a more general way, the process of the invention is directed to upgrading those heavy cracked products that are usually undesired because of their low economical value.

The process of the invention is particularly suitable for treating pyrolysis fuel oil originating from thermal cracking of atmospheric or vacuum gas oils having boiling ranges between about 190° C. to 380° C. resp. 380°–700° C.

An advantageous further development of the process of this invention contains as an additional process step the separation of the polymeric compounds of the pyrolysis fuel oil prior to the hydrogenation thereof. This separation can be conducted by a simple separation with nonpolar solvents, which will selectively precipitate out the polymeric compounds, such solvents being, for example, alkanes with 2 to 8 carbon atoms per molecule, or mixtures thereof, preferably $C_2$- to $C_4$-alkanes, propane being the most preferred of these solvents. Furthermore, gasoline fractions with a boiling range below 125° C. and less then 1% by weight of aromatic compounds may be used as solvents. As is well-known in the art (e.g., Modern Petroleum Technology, Fourth Edition, Applied Science Publishers Limited, 1973, 1975, pages 199-200) substantially all of the polymeric compounds separated in this process step are formed after the thermal cracking step by polymerization of olefins.

Since the pyrolysis fuel oil, after being freed of polymeric compounds, shows increased quality which makes it not only suitable for recycling into the thermal cracking stage after hydrogenation, but which fits it directly for other purposes, for example as fuel oil of improved quality, it is understood that the extraction of the polymeric compounds lies in the scope of the invention regardless whether or not hydrogenation and recycling to the thermal cracking follows.

By this separation, parts of the plane are not longer burdened with the treatment of relatively useless materials. Such a burdening otherwise results not only in lower product yields during the thermal cracking, but also in a rapid contamination of important parts of the plant, such as, for example, catalysts in the hydrogenation stage. Furthermore, hydrogenation of the pyrolysis fuel oil freed of polymeric compounds permits the utilization of a solid-bed reactor having a long catalyst life, whereas, in contrast, a more expensive reactor requiring constant catalyst regeneration must be used to hydrogenate a fraction containing the polymeric compounds.

In an advantageous embodiment of the process of this invention, the hydrogen required for the hydrogenation can at least partially be obtained by means of the process proper. In this connection, the hydrogen produced in the thermal cracking step can be utilized directly, on the one hand, and, on the other hand, the formation of additional hydrogen is possible in a simple way by steam reforming light hydrocarbons produced during the thermal cracking step, especially methane. While it has been customary heretofore to pass the by-products obtained in the olefin production, such as, for example, hydrogen and methane, on to a special utilization, which was connected with expenses for storage and/or conveying pipelines, the proposed mode of operating the process makes it possible to use these products directly in the olefin production process.

For the hydrogenation of the pyrolysis fuel oil, it is possible to use sulfur-resistant hydrocracking catalysts with elements of subgroups VI–VIII of the Periodic Table, or mixtures thereof, in elemental, oxidic, or sulfidic form, as the hydrogenation component on a support of silicic acid, silicic acid/alumina, or on a zeolite basis as the cracking component. Whereas in the conventional process of hydrogenating the entire starting material, care must be taken that hydrocracking reactions take place only to a very minor extent to maximally prevent the formation of light, gaseous hydrocarbons, especially methane, the prevalence of these compounds does not represent a disadvantage in the process of this invention, if the thus-formed methane is utilized in the proposed way for the hydrogen production. Such a mode of operation even offers the advantage that the olefin yield is increased, for during the hydrocracking reactions, light hydrocarbons of 1–7 carbon atoms are substantially obtained. Since these light hydrocarbons are recycled to the thermal cracking stage, they increase the olefin yield of the process. It is, of course, also possible to utilize catalysts having a low cracking activity in the process of this invention. This is advantageous especially if the required hydrogen is not produced by steam reforming the products of the process.

Although hydrogenation may be carried out in the presence of any conventional hydrogenating catalyst, it is preferred to use catalysts as described in copending applications Ser. Nos. 905,485 and 905,486 of Wernicke et al filed May 12, 1978, now U.S. Pat. Nos. 4,210,520 and 4,188,281 respectively.

BRIEF DESCRIPTION OF DRAWING

The appended FIGURE is a schematic flowsheet of the preferred comprehensive embodiment of the invention.

DETAILED DESCRIPTION OF DRAWING

Fresh starting material is fed via conduit 1 and mixed at 2 with hydrogenated pyrolysis fuel oil before being thermally decomposed in the cracking stage 3. The thermal cracking step is conducted in a conventional cracking furnace under conventional conditions. The cracked gas, cooled in a conventional quenching cooler, not shown, passes thereafter via a conduit 4 into a separating stage 5 wherein the gaseous cracked products are conventionally separated, for example by means of a conventional low-temperature separation, into gaseous hydrogen, methane, ethane, ethylene, propane, propylene, and into liquid heavy hydrocarbons, as well as into other products contained in the cracked gas. In addition, the liquid cracked products are separated by distillation into a fraction boiling below 200° C., designated as pyrolysis benzine, and into the pyrolysis fuel oil boiling above 200° C. The pyrolysis fuel oil leaves the separation stage via conduit 7.

In a subsequent process step 8, the polymeric compounds of the pyrolysis fuel oil are removed by solvent precipitation and exit from the plant at 9. For purposes of the precipitation, propane is utilized as the solvent. During this step, the polymeric components of the pyrolysis fuel oil are precipitated in the solid phase, while the remaining components are dissolved in the propane. These remaining components can be separated from the propane in a subsequent stage, not shown, which can be conducted conventionally, for example by distillation and expansion to a low pressure. The thus-recovered solvent is recycled in conduit 10, and make-up propane, derived from the separation stage 5 is added thereto.

The pyrolysis fuel oil freed of the precipitated polymers is then fed via conduit 12 to the hydrogenation stage 13. Moreover, recycle hydrocarbons are passed through conduit 14 into the hydrogenation stage 13, which hydrocarbons had not been converted during a preceding hydrogenation. The hydrogenation is conducted in the presence of catalysts containing as the hydrogenation component sulfides of the metals nickel, tungsten, cobalt, or molybdenum on a zeolite Y support as the cracking component.

Hydrogen is fed via conduit 15 to the hydrogenation reactor, the latter being provided as a conventional solid-bed reactor. A portion of hydrogen fed via conduit 16 is derived from the thermal cracking step 3. To provide the remainder of the hydrogen requirement, the methane obtained in the thermal cracking stage 3 and isolated in the separating stage 5 is fed via conduit 17 to a conventional steam reforming stage 18. In the reforming stage 18, a portion of the methane is combusted to cover the energy requirement for the desired reactions, and the residual portion is reacted with steam to form a gas consisting essentially of hydrogen and carbon oxides. After separation of the carbon oxides, the hydrogen is passed on via conduit 19 to conduit 15 and introduced into the hydrogenation stage 13.

The hydrogenated product exiting from conduit 20 contains gaseous components, the main component of which is hydrogen, and a portion of which is recycled via conduit 21 directly to the hydrogenation stage 13. The remainder passes into a conventional separating stage 22 wherein the residual hydrogen, methane, and hydrocarbons unreacted during the hydrogenation are separated from the remaining products. The separated hydrogen is directly recycled to the hydrogenation stage via the conduits 24, 16 and 15, and the unreacted hydrocarbons are recycled in the same way via conduit 14. The separated methane is fed to the steam reforming stage 18 via conduits 25 and 17 and reacted to hydrogen. The remaining hydrogenation products are returned via conduit 26, mixed with fresh starting material at 2, and recycled to the thermal cracking stage.

In another embodiment of the process the hydrogenation products discharged via conduit 26 can also be further separated conventionally in the separating stage 22, for example into $C_2$–$C_4$-alkanes, $C_5$–$C_{10}$-hydrocarbons, and into hydrocarbons having more than 10 carbon atoms. In this connection, the lastmentioned, heaviest fraction can also be recycled directly to the hydrogenation stage 13 together with the unreacted hydrocarbons. A portion of the thus-obtained alkanes of 2-4 carbon atoms can then be used in place of the propane withdrawn via conduit 11 as the solvent for separating the polymeric compounds at 8.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

In the following two examples, a gas oil was subjected to thermal cracking, thus obtaining a pyrolysis fuel oil, the properties of which are indicated in column (1) of Table I. The polymeric components were separated in each case from the pyrolysis fuel oil, and the thus-obtained fraction was used as the starting material for the hydrogenation. Characterizing data for the polymer-free fraction are indicated in column (2) of Table I. The hydrogenation was carried out in a continuously operated solid-bed reactor.

EXAMPLE 1

Under a pressure of 70 bar and at a temperature of 400° C., the polymer-free fraction was hydrogenated in the presence of a nickel-tungsten catalyst in sulfided form on a zeolite Y support in the hydrogen form. The velocity per unit volume of the liquid starting material was 0.70 l./l. of catalyst material and hour. The hydrogenated product is characterized by the data indicated in column (1) of Table II.

EXAMPLE 2

Under a pressure of 100 bar and at a temperature of 400° C., the polymer-free fraction was hydrogenated in the presence of a cobalt-molybdenum catalyst in sulfided form on a zeolite Y support in the hydrogen form. The velocity per unit volume was 0.64 l./l. of catalyst material and hour. The hydrogenated product is characterized by the data set forth in column (2) of Table II.

TABLE I

| | | (1) | (2) |
|---|---|---|---|
| C | % by Wt. | 90.83 | 90.54 |
| H | % by Wt. | 7.12 | 7.27 |
| S | % by Wt. | 1.6 | 0.9 |
| H:C | mol/mol | 0.941 | 0.964 |
| Average molecular weight | | 520 | 309 |
| Density (15° C.) | g./ml. | 1.20 | 1.05 |
| Coke residue according to Conradson | % by Wt. | 17 | 7 |
| Pensky-Martens flash point (in the closed pan) | °C. | 85 | 47 |
| Polymeric components | % by Wt. | 23.8 | <0.2 |
| Polyaromatics | % by Wt. | 75.1 | 98.5 |
| Monoaromatics | % by Wt. | <0.2 | <0.2 |
| Paraffins + naphthenes | % by Wt. | 0.9 | 1.3 |

TABLE II

| | | (1) | (2) |
|---|---|---|---|
| C | % by Wt. | 86.28 | 86.33 |
| H | % by Wt. | 11.00 | 13.48 |
| S | % by Wt. | 0.02 | 0.05 |
| H:C | mol/mol | 1.530 | 1.873 |
| Boiling range | | 70° C. | 60° C. |
| | | 50%:250° | 50%:120° C. |
| | | 85%:280° | 85%:140° C. |
| | | | 95%:150° C. |
| Polyaromatics | % by Wt. | 12.1 | 5.3 |
| Monoaromatics | % by Wt. | 6.2 | 4.4 |
| Paraffins + naphthenes | % by Wt. | 81.7 | 90.3 |

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the thermal cracking of unhydrogenated hydrocarbon feedstock to produce normally gaseous olefins, the improvement which comprises fractionating the hydrocarbons from the thermal cracking stage into a pyrolysis fuel oil cut boiling above 200° C. and a cut boiling below 200° C., separating polymeric compounds, which have been produced in the thermal cracking stage, from said pyrolysis fuel oil cut boiling above 200° C., thereby producing a substantially polymeric-compounds-free cut boiling above 200° C., catalytically hydrogenating only said substantially polymeric-compounds-free cut boiling above 200° C., and recycling resultant hydrogenated polymeric-compounds-free cut boiling above 200° C. to the thermal cracking stage where said cut is mixed and thermally cracked with the unhydrogenated hydrocarbon feedstock.

2. A process according to claim 1 wherein the unhydrogenated hydrocarbon feedstock to be cracked comprises an atmospheric gas oil or a vacuum gas oil.

3. A process according to claim 1 wherein the unhydrogenated hydrocarbon feedstock is an atmospheric gas oil having a boiling range of about 190°–380° C.

4. A process according to claim 1, wherein the unhydrogenated hydrocarbon feedstock is a vacuum gas oil having a boiling range of 380°–700° C.

5. A process according to claim 1 wherein the amount of unhydrogenated hydrocarbon feedstock passed to the thermal cracking stage is greater than the amount of the recycled resultant hydrogenated polymeric-compounds-free cut boiling above 200° C.

6. A process according to claim 1 wherein the product leaving the thermal cracking stage comprises 1–45% pyrolysis fuel oil.

7. In a process for the thermal cracking of unhydrogenated hydrocarbon feedstock to produce normally gaseous olefins, the improvement which comprises fractionating the hydrocarbons from the thermal cracking stage into a pyrolysis fuel oil cut boiling above 200° C. and a cut boiling below 200° C., adding only to the pyrolysis fuel oil cut boiling above 200° C. a solvent which selectively precipitates out polymeric components which have been produced in the thermal cracking stage, separating said precipitate from the remaining hydrocarbons, separating the solvent from said remaining hydrocarbons, hydrogenating remaining hydrocarbons, and recycling resultant hydrogenated polymeric-compounds-free cut boiling above 200° C. to the thermal cracking stage.

8. A process according to claim 7, wherein said solvent comprises a $C_2$–$C_4$ alkane.

9. A process according to claim 7 wherein said solvent is propane.

* * * * *